(12) United States Patent
Stewart et al.

(10) Patent No.: US 10,954,830 B1
(45) Date of Patent: Mar. 23, 2021

(54) CAM PHASER CONTROL SYSTEMS AND METHODS FOR ENGINE OFF CONDITIONS

(71) Applicant: GM GLOBAL TECHNOLOGY OPERATIONS LLC, Detroit, MI (US)

(72) Inventors: Etsuko M. Stewart, Milford, MI (US); Scott T. Feldmann, South Lyon, MI (US); Pratap S. Murthy, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 16/553,437

(22) Filed: Aug. 28, 2019

(51) Int. Cl.
| | |
|---|---|
| *F01L 1/34* | (2006.01) |
| *F01L 9/04* | (2006.01) |
| *F02N 11/08* | (2006.01) |
| *H02P 9/00* | (2006.01) |

(52) U.S. Cl.
CPC ............ *F01L 9/04* (2013.01); *F01L 1/34* (2013.01); *F02N 11/0818* (2013.01); *H02P 9/009* (2013.01); *F01L 2009/0494* (2013.01); *F01L 2820/032* (2013.01)

(58) Field of Classification Search
CPC ....... F01L 9/04; F01L 1/34; F01L 2009/0494; F01L 2820/032; F02N 11/0818; H02P 9/009
See application file for complete search history.

(56) References Cited

U.S. PATENT DOCUMENTS 8,020,527 B2 * 9/2011 Mashiki .................. F01L 1/352
123/90.15

* cited by examiner

*Primary Examiner* — Zelalem Eshete

(57) ABSTRACT

A control system of a vehicle includes: an electric motor configured to phase rotation of an camshaft of an engine relative to rotation of a crankshaft of the engine; a current module configured to, while the engine is off: selectively transition a current signal back and forth between a first state and a second state; and a motor driver module configured to, while the engine is off: apply power to the electric motor from a battery and adjust a position of the camshaft toward a predetermined position when the current signal is in the first state; and disconnect the electric motor from the battery and allow the position of the camshaft to move away from the predetermined position when the current signal is in the second state.

20 Claims, 7 Drawing Sheets

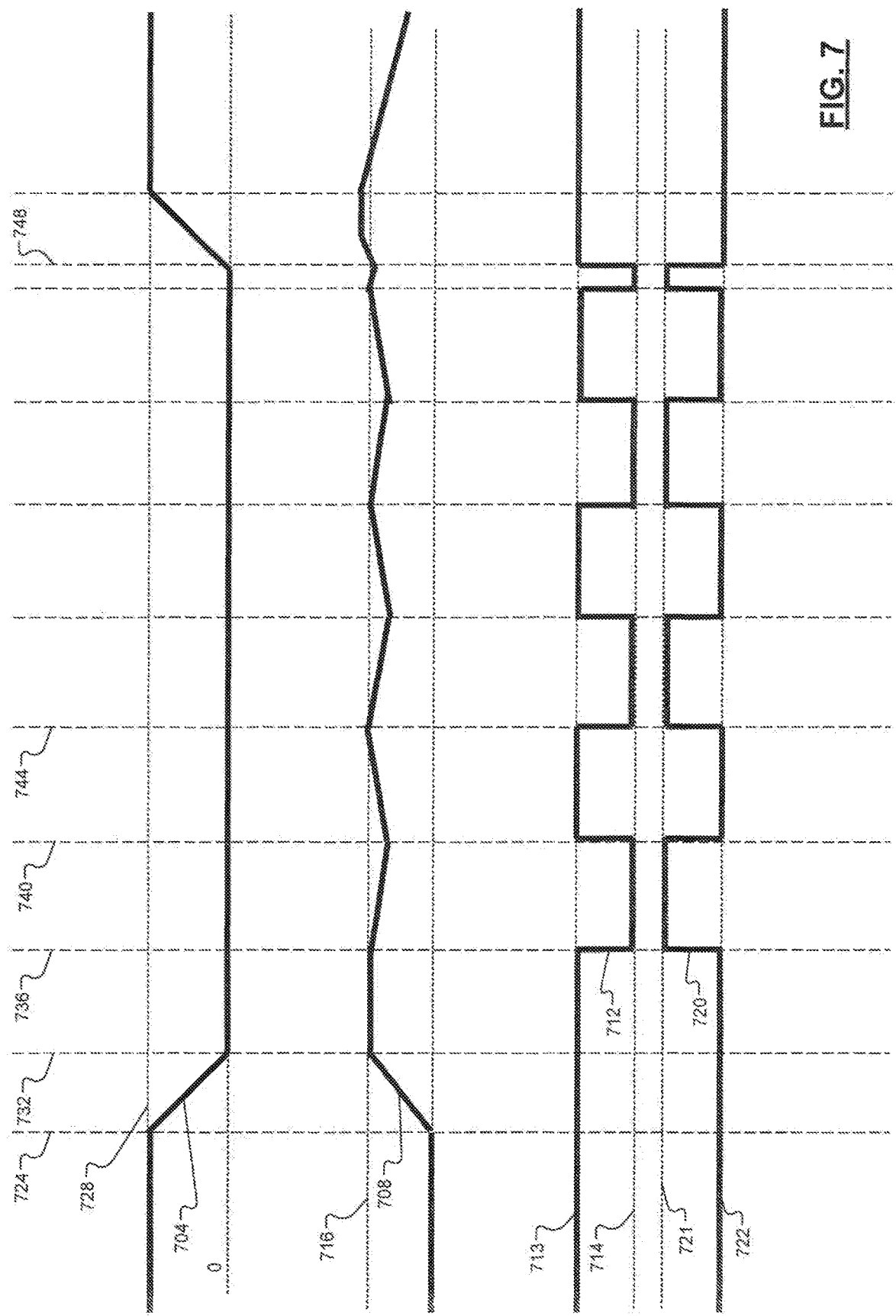

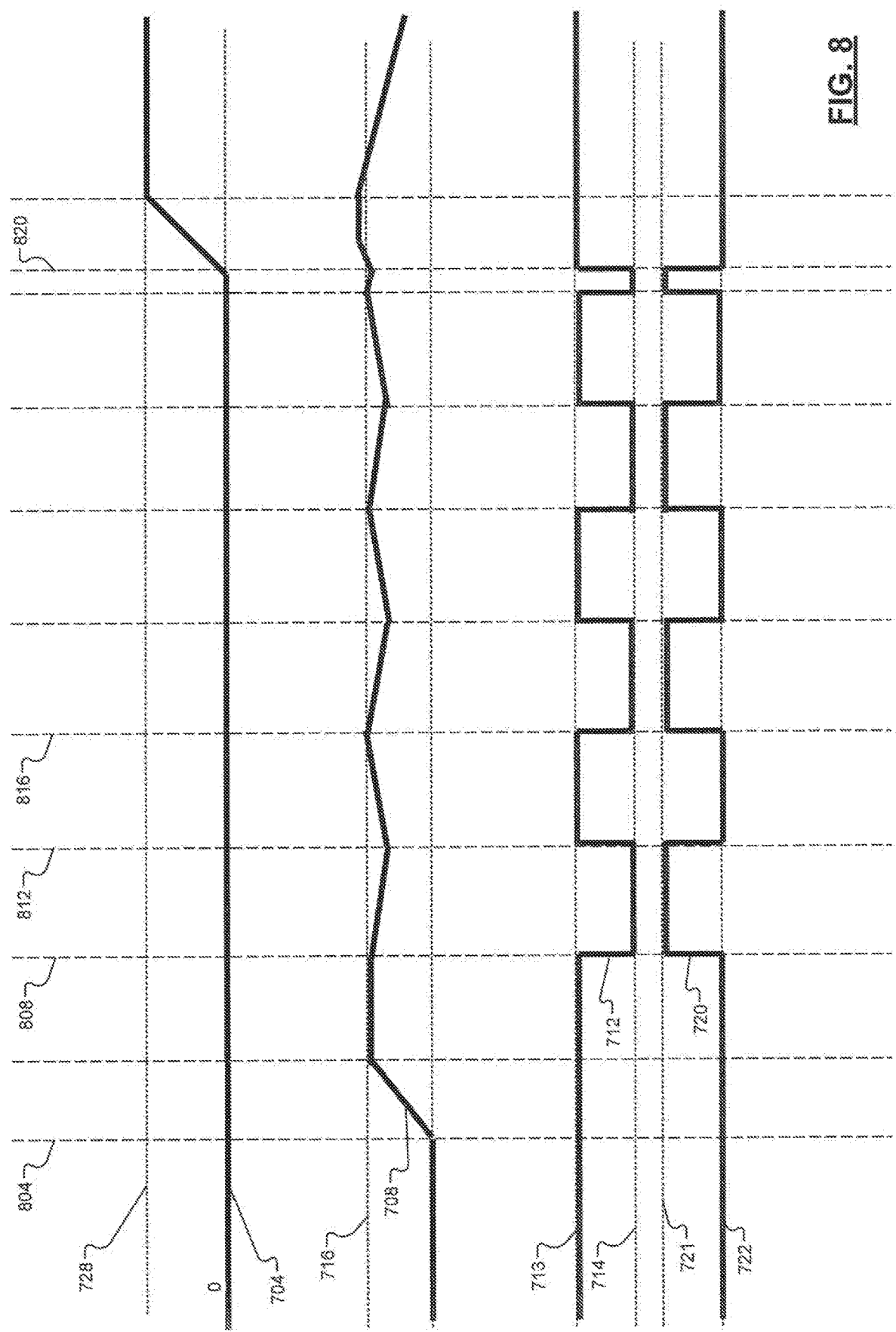

CAM PHASER CONTROL SYSTEMS AND METHODS FOR ENGINE OFF CONDITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to control systems and methods for internal combustion engines and more particularly to camshaft phaser control systems and methods.

Vehicles typically include an internal combustion engine that combusts an air/fuel mixture within cylinders to produce drive torque. The engine may include pistons that reciprocate within the cylinders and that are coupled to a crankshaft. The pistons drive rotation of the crankshaft. The engine may also include a valve train that controls airflow into and out of the cylinders. The valve train may include one or more camshafts that selectively open and close intake valves and exhaust valves of the cylinders.

The camshaft(s) rotate with the crankshaft and control the timing of the opening and closing of the intake and exhaust valves relative to a position of the crankshaft. The valve train may further include one or more cam phasers coupled to the camshaft(s) and the crankshaft. The cam phaser(s) may adjust the rotational position of the camshaft(s) with respect to the position of the crankshaft.

SUMMARY

In a feature, a control system of a vehicle includes: an electric motor configured to phase rotation of an camshaft of an engine relative to rotation of a crankshaft of the engine; a current module configured to, while the engine is off and an ignition system of the vehicle is on during an auto-stop portion of an auto-stop/start event: selectively transition a current signal back and forth between a first state and a second state; and a motor driver module configured to, while the engine is off and the ignition system of the vehicle is on during the auto-stop portion of the auto-stop/start event: apply power to the electric motor from a battery and adjust a position of the camshaft toward a predetermined position when the current signal is in the first state; and disconnect the electric motor from the battery and allow the position of the camshaft to move away from the predetermined position when the current signal is in the second state.

In further features, the current module is configured to, during the auto-stop portion of the auto-stop/start event, set the current signal to the first state and maintain the current signal in the first state for a predetermined period after both (a) a first rotational speed of the crankshaft reaches zero during the auto-stop portion of the auto-stop/start event and (b) a second rotational speed of the electric motor reaches zero during the auto-stop portion of the auto-stop/start event.

In further features, the current module is further configured to, during the auto-stop portion of the auto-stop/start event, transition the current signal from the first state to the second state when the predetermined period has passed after both (a) the first rotational speed of the crankshaft reached zero during the auto-stop portion of the auto-stop/start event and (b) the second rotational speed of the electric motor reaches zero during the auto-stop portion of the auto-stop/start event.

In further features, the current module is further configured to, during the auto-stop portion of the auto-stop/start event, maintain the current signal in the second state until a difference between the position of the camshaft when the current signal transitioned from the first state to the second state and a present position of the camshaft is greater than a first predetermined position.

In further features, the current module is further configured to, during the auto-stop portion of the auto-stop/start event, transition the current signal from the second state to the first state when the difference is greater than the first predetermined position.

In further features, the current module is further configured to, during the auto-stop portion of the auto-stop/start event, maintain the current signal in the first state for a second predetermined period after the difference is greater than the first predetermined position.

In further features, the current module is configured to maintain the current signal in the first state until the difference is less than a second predetermined position that is less than the first predetermined position.

In further features, the current module is configured to, during the auto-stop portion of the auto-stop/start event, set the current signal to the first state and maintain the current signal in the first state until a temperature of the electric motor is greater than a predetermined temperature after both (a) a first rotational speed of the crankshaft reaches zero during the auto-stop portion of the auto-stop/start event and (b) a second rotational speed of the electric motor reaches zero during the auto-stop portion of the auto-stop/start event.

In further features, the current module is further configured to, during the auto-stop portion of the auto-stop/start event, transition the current signal from the first state to the second state when the temperature of the electric motor is greater than the predetermined temperature.

In further features, the current module is further configured to, during the auto-stop portion of the auto-stop/start event, maintain the current signal in the second state until a difference between (a) a present position of the camshaft is greater than a first predetermined position; and (b) one of (1) a target position of the camshaft when the current signal transitioned from the first state to the second and (2) the position of the camshaft when the current signal transitioned from the first state to the second state.

In further features, the current module is further configured to, during the auto-stop portion of the auto-stop/start event, transition the current signal from the second state to the first state when the difference is greater than the first predetermined position.

In further features, the current module is further configured to, during the auto-stop portion of the auto-stop/start event, maintain the current signal in the first state until the temperature of the electric motor is greater than the predetermined temperature.

In further features, the current module is configured to maintain the current signal in the first state until the difference is less than a second predetermined position that is less than the first predetermined position.

In further features, the current module is configured to set the current signal to the first state and maintain the current signal in the first state until a current through the electric motor is greater than a predetermined current after both (a) a first rotational speed of the crankshaft reaches zero during the auto-stop portion of the auto-stop/start event and (b) a second rotational speed of the electric motor reaches zero during the auto-stop portion of the auto-stop/start event.

In further features, the current module is further configured to, during the auto-stop portion of the auto-stop/start event, transition the current signal from the first state to the second state when the current through the electric motor is greater than the predetermined current.

In further features, the current module is further configured to, during the auto-stop portion of the auto-stop/start event, maintain the current signal in the second state until a difference between (a) a present position of the camshaft is greater than a first predetermined position; and (b) one of (1) a target position of the camshaft when the current signal transitioned from the first state to the second and (2) the position of the camshaft when the current signal transitioned from the first state to the second state.

In further features, the current module is further configured to, during the auto-stop portion of the auto-stop/start event, transition the current signal from the second state to the first state when the difference is greater than the first predetermined position.

In further features, the current module is further configured to, during the auto-stop portion of the auto-stop/start event, maintain the current signal in the first state until the current through the electric motor is greater than the predetermined current.

In a feature, a control system of a vehicle includes: an electric motor configured to phase rotation of an camshaft of an engine relative to rotation of a crankshaft of the engine; a current module configured to, while the engine is off and an ignition system of the vehicle is on before the engine is started: selectively transition a current signal back and forth between a first state and a second state; and a motor driver module configured to, while the engine is off and the ignition system of the vehicle is on before the engine is started: apply power to the electric motor from a battery and adjust a position of the camshaft toward a predetermined position when the current signal is in the first state; and disconnect the electric motor from the battery and allow the position of the camshaft to move away from the predetermined position when the current signal is in the second state.

In a feature, a control system of a vehicle includes: a cam phaser configured to phase rotation of an camshaft of an engine relative to rotation of a crankshaft of the engine; a current module configured to, while the engine is off and an ignition system of the vehicle is on during an auto-stop portion of an auto-stop/start event: selectively transition a current signal back and forth between a first state and a second state; and a motor driver module configured to, while the engine is off and the ignition system of the vehicle is on during the auto-stop portion of the auto-stop/start event: apply power to an electric motor from a battery and adjust a position of the camshaft toward a predetermined position when the current signal is in the first state; and disconnect the electric motor from the battery and allow the position of the camshaft to move away from the predetermined position when the current signal is in the second state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 includes an example graph including traces of engine speed and cam position versus time during an auto-stop/start event; and FIG. 8 includes an example graph including traces of engine speed and cam position versus time while an ignition system of a vehicle is on before an engine is started.

In the drawings, reference numbers may be reused to identify similar and/or identical elements.

DETAILED DESCRIPTION

Hydraulic cam phasers are one type of cam phaser. Another type of cam phaser is an electric cam phaser. Electric cam phasers are different than hydraulic cam phasers in that electric cam phasers do not rely on the availability of pressurized oil for actuation. Electric cam phasers can be actuated at times when an engine is off.

The present application involves electric cam phasers. Electric cam phasers include both (1) cam phasers that include an electric motor that adjusts rotation of a camshaft and (2) cam phasers that include a hydraulic actuator that adjusts rotation of a camshaft and receives hydraulic fluid from an electric pump that can operate while the engine is off.

When an engine is transitioned off for an auto-stop portion of an auto-stop/start event, a control module applies current to an electric cam phaser to adjust a position of the associated camshaft toward a predetermined position, such as a fully retarded position. The control module also applies current to the electric cam phaser to adjust the position of the associated camshaft toward the predetermined position when the ignition system of the vehicle is ON before the engine is cranked for startup. The camshaft being in the predetermined position at engine startup may provide better startups (e.g., having less vibration) than if the camshaft is in a more advanced position. The predetermined position may vary. For example, the predetermined position may be set differently for auto-starts than other engine startups (e.g., key starts). The predetermined position may also be set, for example, based on one or more environmental conditions.

Continuously applying power to the electric cam phaser while the engine is off, however, increases power consumption and increases a temperature of the electric cam phaser. When power is disconnected from the electric cam phaser, valve springs bias the camshaft away from the predetermined position.

According to the present application, the control module toggles current to the motor ON and OFF during the auto-stop portion of the auto-stop/start event to maintain the position of the camshaft closer to the predetermined position. The control module also toggles current to the motor ON and OFF when the ignition system of the vehicle is ON before the engine is cranked for startup to maintain the position of the camshaft closer to the predetermined position.

Maintaining the position of the camshaft closer to the predetermined position provides a better startup than continuously disabling power to the motor while the engine is off. Additionally, toggling the current to the motor ON and OFF decreases power consumption and decreases the temperature of the electric cam phaser.

Figure 1:
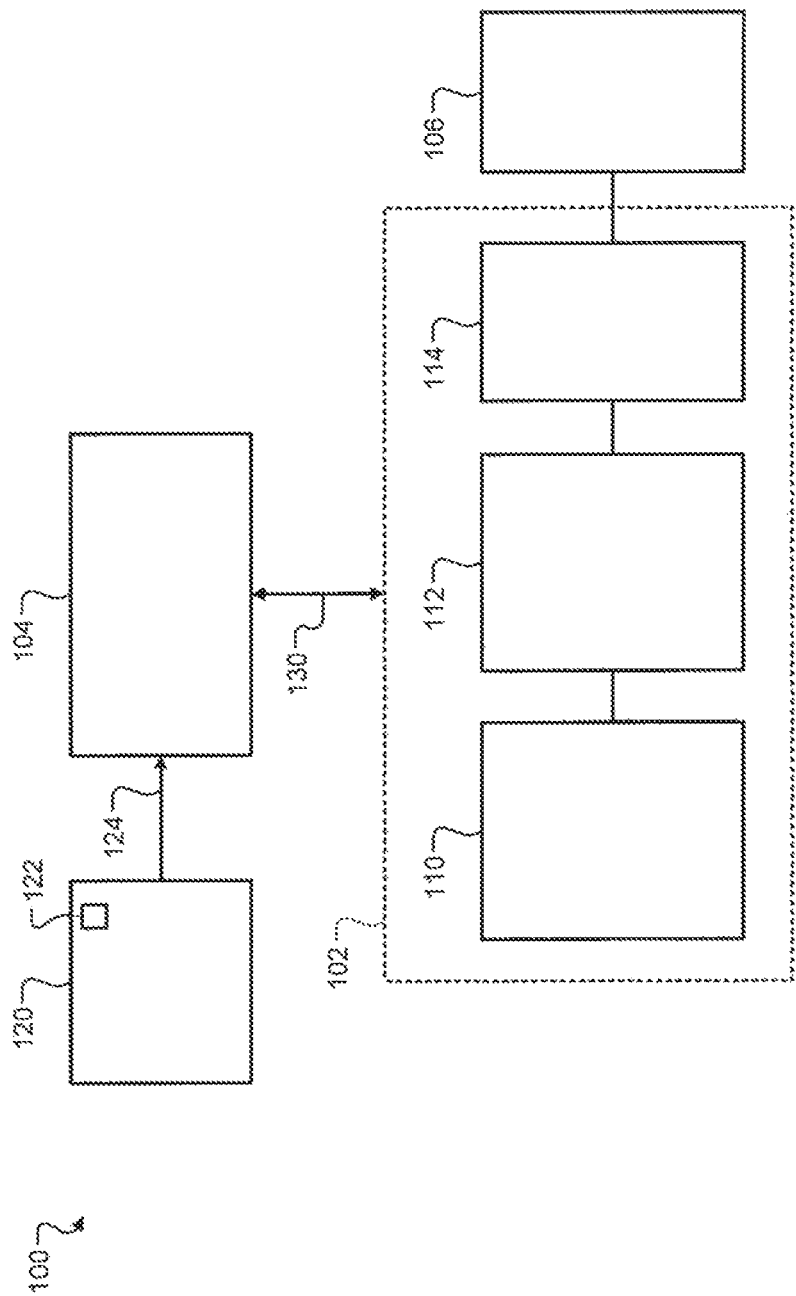
FIG. 1 is a functional block diagram of an example vehicle system.

Referring now to FIG. 1, a functional block diagram of an example vehicle system 100 is presented. The vehicle system 100 includes a powertrain 102 controlled by a powertrain control module 104. The powertrain 102 produces drive torque used to drive one or more wheels 106 of the vehicle. The powertrain 102 includes an engine system 110, a transmission 112, and a driveline 114.

The engine system 110 produces drive torque that is transmitted to the wheels 106 via the transmission 112 and the driveline 114. The present disclosure is not limited to transmissions or drivelines of a particular type. For example only, the transmission 112 may be an automatic transmission, a manual transmission, an automated manual transmission, or another suitable type of transmission.

The powertrain control module 104 controls operation of the powertrain 102 based on various driver inputs, vehicle operating conditions, and other vehicle system signals. The driver inputs may be received by driver interface modules 120 that generate driver signals in response to the driver inputs.

The driver interface modules 120 may include an ignition switch or button 122 that can be manipulated by the driver to start and shut down the vehicle. User input to the ignition switch 122 may provide multiple ignition states, for example, an OFF state, an ON state, and a CRANK state. The ignition switch 122 may output an ignition signal 124 indicative of the ignition switch state.

The driver interface modules 120 may further include, for example, an accelerator pedal (not shown) and a brake pedal (not shown) that can be manipulated by the driver. An accelerator pedal position signal and a brake pedal position signal may be generated based on the positions of the accelerator pedal and the brake pedal, respectively. An accelerator pedal position sensor and a brake pedal position sensor may measure the positions of the accelerator pedal and the brake pedal, respectively. The driver interface modules 120 may further include a cruise control system (not shown).

Various vehicle operating conditions and parameters are measured by sensors and/or determined, such as discussed further below. The vehicle system signals include the driver signals and other signals 130 generated by the various components of the vehicle system 100.

Figure 2:
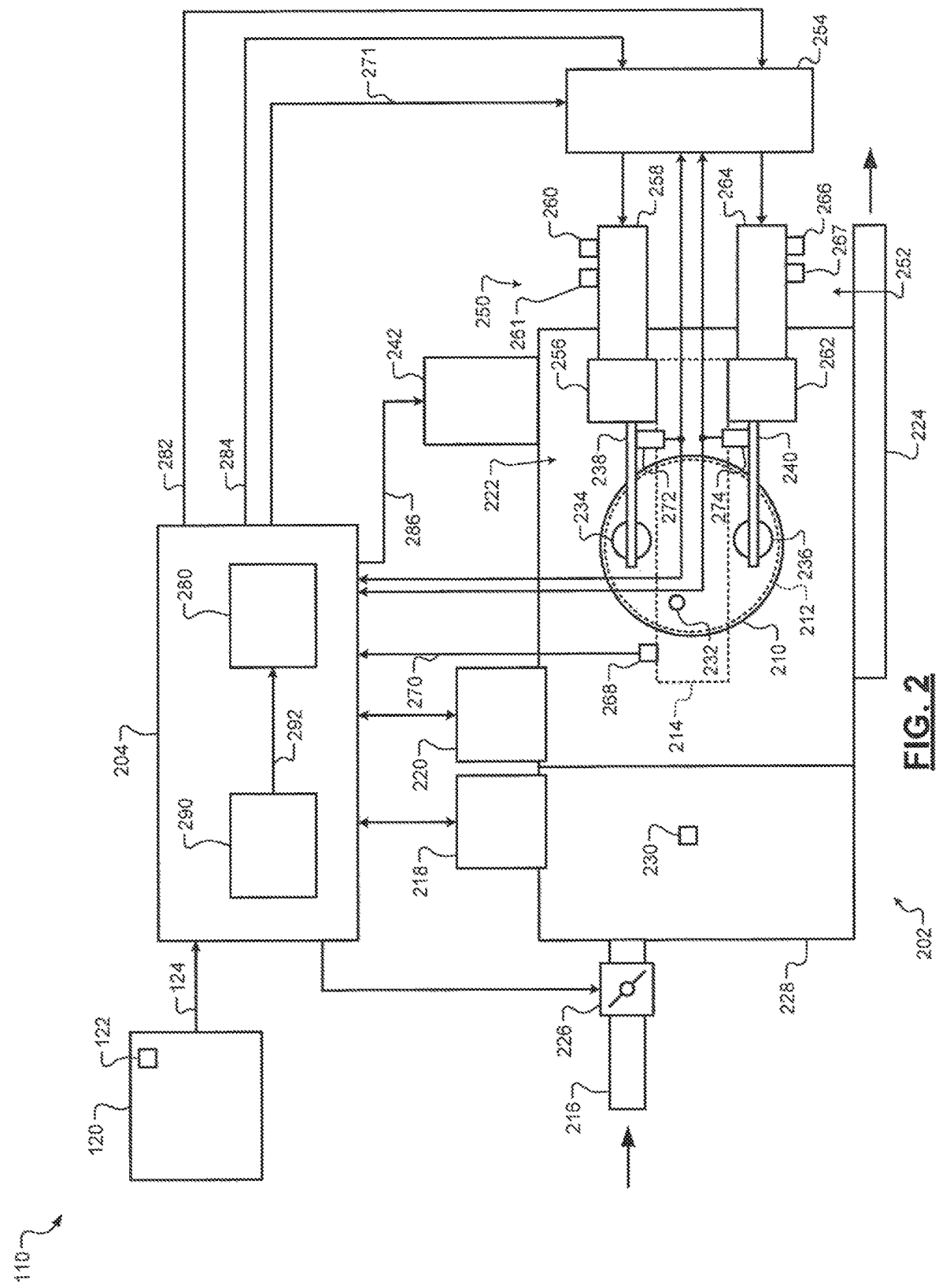
FIG. 2 is a functional block diagram of an example engine system.

Referring now to FIG. 2, a functional block diagram of an example implementation of the engine system 110 is presented. The engine system 110 includes an internal combustion engine (ICE) 202 that is controlled by an engine control module (ECM) 204 based on various driver inputs, engine operating conditions, and other vehicle system signals.

The ICE 202 produces drive torque by combusting an air/fuel mixture and may be one of several types. For example only, the ICE 202 may be a spark-ignition (SI) engine or a compression-ignition (CI) engine. The ICE 202 combusts the air/fuel mixture within a cylinder 210 of the engine. The ICE 202 is presented as a single cylinder engine for simplicity, but the ICE 202 can include more than one cylinder. A piston 212 reciprocates within the cylinder 210 between a top-dead-center (TDC) position and a bottom-dead-center (BDC) position. Combustion of the air/fuel mixture drives the piston 212, and the piston 212 drives rotation of a crankshaft 214.

The ICE 202 includes an intake system 216, a fuel system 218, an ignition system 220, a valve train 222, and an exhaust system 224. The intake system 216 controls air flow into the ICE 202. The intake system 216 may include a throttle 226 that controls airflow into an intake manifold 228. The throttle 226 may include a butterfly valve having a rotatable blade or another suitable type of throttle. Air is drawn into the cylinder 210 from the intake manifold 228.

The fuel system 218 supplies fuel to the ICE 202 and may include a fuel tank (not shown) that contains the fuel. The fuel system 218 also includes one or more fuel injectors that control an amount of the fuel injected. In various implementations, such as central point injection and multi-point injection implementations, one or more fuel injectors may inject fuel into the intake system 216 upstream of the cylinder 210. In direct-injection implementations, one or more fuel injectors may inject fuel directly into the cylinder 210. For example purposes only, a single fuel injector 230 is shown that injects fuel into the intake system 216 upstream of the cylinder 210.

The ignition system 220 may supply energy for initiating combustion within the cylinder 210 in the form of a spark supplied by a spark plug 232 extending into the cylinder 210. In some types of engines, such as CI engines, spark plugs may be omitted and combustion may be initiated by heat from compression.

The valve train 222 includes at least one intake valve and one exhaust valve that are actuated by at least one camshaft. The valve train 222 may have one of several configurations, such as an overhead camshaft configuration or a cam-in-block configuration. For example only, the valve train 222 presented has an overhead camshaft configuration including an intake valve 234 and an exhaust valve 236 actuated by an intake camshaft 238 and an exhaust camshaft 240, respectively.

When in an open position, the intake valve 234 allows air and fuel to enter the cylinder 210 via the intake system 216. When in a closed position, the intake valve 234 closes the cylinder 210 to the intake system 216. When in an open position, the exhaust valve 236 allows combustion gases to exit the cylinder 210 to the exhaust system 224. When in a closed position, the exhaust valve 236 closes the cylinder 210 to the exhaust system 224. In various implementations, multiple intake valves and/or exhaust valves may be provided for each cylinder of the ICE 202.

The intake camshaft 238 and the exhaust camshaft 240 are coupled to and rotate with the crankshaft 214. The intake camshaft 238 and the exhaust camshaft 240 may be coupled to the crankshaft 214, for example, via one or more chains or belts. In this manner, rotation of the intake camshaft 238 and the exhaust camshaft 240 are synchronized with rotation of the crankshaft 214.

The intake camshaft 238 controls the opening and closing of the intake valve 234 (i.e., intake valve timing). The intake camshaft 238 includes a cam lobe (not shown) that is associated with the intake valve 234. The cam lobe engages the intake valve 234 to control the opening and closing of the intake valve 234. In various implementations, the intake camshaft 238 may include one or more additional cam lobe (not shown) associated with the intake valve 234 having a different profile (for different lift and/or timing). Other types of variable valve lift systems may be used. The intake camshaft 238 includes one or more cam lobes per intake valve.

A valve lift actuator module 242 may control the variable valve lift system. More specifically, the valve lift actuator module 242 controls the intake valve lift. For example only, the valve lift actuator module 242 may control the intake valve lift between low lift operation and high lift operation. The intake valve 234 may open to a maximum amount during high lift operation and open to a minimum amount during low lift operation. The valve lift actuator module 242 may also control the intake valve lift to one or more additional intake valve lift states between high and low lift operation.

The exhaust camshaft 240 controls the opening and closing of the exhaust valve 236. The exhaust camshaft 240 also includes one or more cam lobes (not shown). The cam lobe(s) engage(s) the exhaust valve 236 to control the opening and closing of the exhaust valve 236. The exhaust camshaft 240 includes one or more cam lobes per exhaust valve. As the intake and exhaust camshafts 238 and 240 rotate, the lobes of the intake and exhaust camshafts 238 and 240 displace the intake and exhaust valves 234 and 236, respectively, between the open and closed positions.

The valve train 222 also includes a cam phaser system that selectively adjusts intake and/or exhaust valve timing by controlling phase angles between the crankshaft 214 and the intake and exhaust camshafts 238 and 240. An example cam phaser system presented includes an intake phaser 250, an exhaust phaser 252, and a motor driver module 254.

The intake phaser 250 controls the intake valve timing by selectively adjusting the position of the intake camshaft 238 relative to the position of the crankshaft 214. The rotational position of the intake camshaft 238 relative to the position of the crankshaft 214 may be referred to as intake phase angle.

The intake phaser 250 may include a gear train 256, an electric motor 258, a temperature sensor 260, and a current sensor 261. The gear train 256 includes a drive gear (not shown) in a meshed arrangement with a driven gear (not shown). The drive gear is coupled to the crankshaft 214, and the driven gear is coupled to the intake camshaft 238. In various arrangements, one or more intermediate gears may be interposed between the drive gear and the driven gear. Mechanical stops (not shown) may be built into the gear train 256. The electric motor 258 is drivingly coupled to the gear train 256.

The mechanical stops may prevent the electric motor 258 from advancing or retarding the intake camshaft 238 such that the intake phase angle would exceed a fully advanced angle or a fully retarded angle. In this manner, the mechanical stops establish what may be referred to as a phasing range or a phasing authority. The gear train 256 and the electric motor 258 may work together to maintain an intake phase angle. The temperature sensor 260 senses a temperature of the electric motor 258 and outputs a signal indicative of the temperature sensed. The current sensor 261 measures a current through the electric motor 258.

The exhaust phaser 252 may control the exhaust valve timing by selectively adjusting the position of the exhaust camshaft 240 relative to the crankshaft position. The position of the exhaust camshaft 240 relative to the position of the crankshaft 214 may be referred to as exhaust phase angle. The exhaust phaser 252 may be structurally and functionally similar to the intake phaser 250. The exhaust phaser 252 may include a gear train 262, an electric motor 264, a temperature sensor 266, and a current sensor 267 that function similarly or identically to the gear train 256, the electric motor 258, the temperature sensor 260, and the current sensor 261 discussed above.

The motor driver module 254 controls the intake phase angle and the exhaust phase angle via the electric motors 258 and 264 based on various inputs. The inputs include various control values received from the ECM 204 include a target intake position 282 and a target exhaust position 284. The motor driver module 254 adjusts the intake and exhaust positions via the electric motors 258 and 264, respectively, to achieve the target intake and exhaust positions 282 and 284. The motor driver module 254 may determine present values of the intake and exhaust phase angles to determine how to adjust the electric motors 258 and 264 to achieve the target intake and exhaust positions 282 and 284. In various implementations, the motor driver module 254 may be integrated within the ECM 204.

While the example of the intake and exhaust phasers having electric motors is provided, the present application is also applicable to the intake and exhaust phasers having hydraulic actuators and a hydraulic fluid pump having an electric motor.

A crankshaft position sensor 268 may sense a rotational position of the crankshaft 214 and generate a crankshaft position signal (CPS) 270 based on the crankshaft rotational position sensed. For example only, the CPS may include a train of pulses where the crankshaft position sensor 268 generates a pulse in the pulse train as a tooth of a first toothed wheel that rotates with the crankshaft 214 passes the crankshaft position sensor 268. The ECM 204 may determine a crankshaft position 271 by counting the pulses in the CPS 270. The crankshaft position 271 may correspond to the present position of the crankshaft 214.

Camshaft position sensors 272 and 274 may sense rotational positions of the intake and exhaust camshafts 238 and 240, respectively. The camshaft position sensors 272 and 274 output camshaft position signals indicative of the intake and exhaust camshaft rotational positions sensed, respectively.

An intake camshaft position 279 can be determined by counting the pulses in the camshaft position signal. An exhaust camshaft position (not specifically shown or numbered) can be determined by counting pulses in the camshaft position signal. The intake camshaft position 279 and the exhaust camshaft position may correspond to the present positions of the intake and exhaust camshafts 238 and 240. For example only, the intake camshaft position 279 and the exhaust camshaft position may be determined independently by the ECM 204 and the motor driver module 254. In various implementations, the intake camshaft position 279 and the exhaust camshaft position may be determined by one of the ECM 204 and the motor driver module 254 and provided to the other one of the ECM 204 and the motor driver module 254.

Present values of the intake and exhaust phase angles can be determined based on the crankshaft position 271 and the intake camshaft position 279 and the exhaust camshaft position, respectively. When making adjustments, the motor driver module 254 may control operation of the electric motors 258 and 264 additionally or alternatively based on the outputs of the temperature sensors 260 and 266. The intake and exhaust phasers 250 and 252 may therefore be adjusted to achieve the target intake and exhaust positions 282 and 284.

The ECM 204 controls operation of the ICE 202 and engine torque output. The ECM 204 may control the engine torque output by controlling various engine operating parameters including mass air flowrate (MAF), a manifold pressure, the air/fuel mixture, spark timing, valve timing, valve lift, and one or more suitable engine operating parameters.

For example only, the ECM 204 may include a valve control module 280 (see also FIG. 3) that generates the target intake position 282, the target exhaust position 284, and a target valve lift 286. The motor driver module 254 may control the electric motors 258 and 264 based on the target intake and exhaust positions 282 and 284, respectively. The valve lift actuator module 242 may control intake valve lift based on the target valve lift 286.

The ECM 204 may also include an auto-stop/start module 290 that controls the performance of auto-stop/start events of the ICE 202. Auto-stop/start events include an auto-stop portion (event) and an auto-start portion (event). An auto-stop event includes shutting down the ICE 202 when one or more predetermined enabling criteria are satisfied when vehicle shutdown has not been commanded (e.g., while the ignition system is in the ON state). The ECM 204 disables the injection of fuel, disables the provision of spark, phases the intake and exhaust camshafts to the predetermined intake and exhaust positions, and perform other engine shutdown operations for an auto-stop event.

While the ICE 202 is shut down for an auto-stop event, the ECM 204 may selectively perform an auto-start event. An auto-start event may include, for example, enabling fueling, enabling the provision of spark, engaging a starter motor with the ICE 202, and applying current to the starter motor to start the ICE 202.

The ECM 204 phases the intake and exhaust camshafts to the respective predetermined positions while the ICE 202 is shut down for auto-stop events. The ECM 204 also phases the intake and exhaust camshafts to the respective predetermined positions when the ignition signal 124 is in the ON state after being transitioned from the OFF state to the ON state and prior to the ignition signal 124 transitioning to the CRANK state. A driver interface module may control the state of the ignition signal 124 as discussed further below.

The auto-stop/start module 290 may generate an auto-stop/start signal 292 for an auto-stop/start event. For example only, the auto-stop/start module 290 may set the auto-stop/start signal 292 to a first state to perform an auto-stop when one or more auto-stop/start enabling conditions are satisfied. For example, the auto-stop/start module 290 set the auto-stop/start signal to the first state when a vehicle speed is less than a predetermined speed (or stopped) and the driver is depressing the brake pedal. Depression of the brake pedal may be indicated by the brake pedal position (BPP), for example, measured using a BPP sensor. The vehicle speed may be measured using a sensor or determined based on one or more other parameters, such as one or more wheel speeds measured using wheel speed sensors.

The auto-stop/start module 290 may maintain the auto-stop/start signal 292 in the first state until one or more auto-start enabling conditions are satisfied or the ignition signal 124 is transitioned to the OFF state. When the one or more auto-start enabling conditions are satisfied, the auto-stop/start module 290 may transition the auto-stop/start signal 292 to a second state. For example, the auto-stop/start module 290 may transition the auto-stop/start signal 292 to the second state when the driver releases the brake pedal while the ICE 202 is OFF for an auto-stop event. The release of the brake pedal may be indicated by the BPP.

Auto-stop events and auto-start events are performed while the ignition system of the vehicle is ON, without the driver requesting that the ICE 202 or vehicle be shut down. More specifically, auto-stop events and auto-start events are performed between a time when a driver starts the ICE 202 via transitioning the ignition signal 124 to the CRANK state and a next time when the driver shuts down the vehicle by transitioning the ignition signal 124 to the OFF state.

The valve control module 280 receives the auto-stop/start signal 292. When the auto-stop/start signal 292 is in the first state (for an auto-stop event) and when the ignition signal 124 is in the ON state but the ICE 202 is still off prior to the ignition signal 124 transitioning to the CRANK state, the valve control module 280 transitions the target intake position 282 to a predetermined intake position, such as the fully retarded position. Performing intake cam phasing to the predetermined position may provide better engine starts (e.g., with less vibration at seat tracks of the vehicle) when the ICE 202 is started for an auto-start event or in response to the ignition signal 124 transitioning to the CRANK state. While the present application is also applicable to phasing of the exhaust camshaft 240, for purposes of discussion only, the present disclosure will be described in conjunction with the intake camshaft 238 and the target intake position 282.

While the ICE 202 is shutdown (e.g., for an auto-stop event or while the ICE 202 is OFF before the ignition signal 124 transitions to the crank state), valve springs that bias the intake and exhaust valves toward the closed positions may urge rotation of the intake camshaft 238. Controlling the electric motor 258 to maintain the target intake position 282 while the ICE 202 is off consumes power and increases a temperature of the electric motor 258.

The present application involves selectively turning the electric motor 258 on and off while the ICE 202 is shut down for an auto-stop event or while the ICE 202 is off before the ignition signal 124 transitions to the CRANK state. Turning the electric motor 258 off allows the valve springs to rotate the intake camshaft 238 away from the target intake position 282 but allows the electric motor 258 to cool and stops power consumption. Turning the electric motor 258 on drives the intake camshaft 238 toward to the target intake position 282. Relative to leaving the electric motor 258 on continuously, turning the electric motor 258 on and off decreases overall power consumption and decreases average temperature of the electric motor 258. Turning the electric motor 258 on and off also provides better startups of the ICE 202 than leaving the electric motor 258 off. In the example of a cam phaser having a hydraulic actuator and a pump having an electric motor, the present application involves selectively turning the electric motor of the pump on and off while the ICE 202 is shut down for an auto-stop event or while the ICE 202 is off before the ignition signal 124 transitions to the CRANK state.

Figure 3:
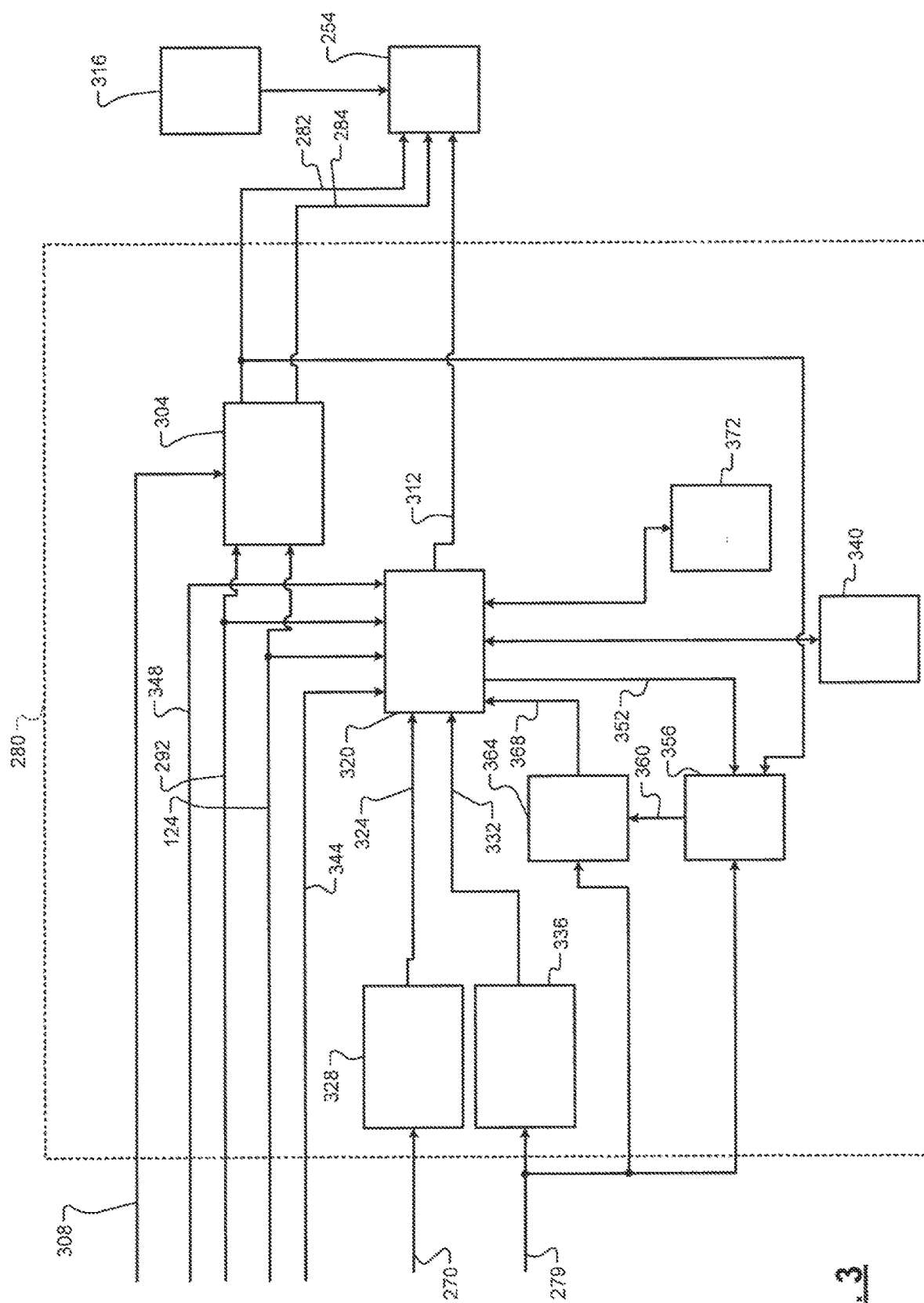
FIG. 3 is a functional block diagram of an example valve control system.

Referring now to FIG. 3, a functional block diagram of an example implementation of a valve control system is presented. A target module 304 sets the target intake position 282 and the target exhaust position 284 based on one or more operating parameters 308 while the ICE 202 is running (on). The ICE 202 runs after auto-start events and after the ignition signal 124 transitions to the ON state from the CRANK state. The target module 304 may determine the target intake and exhaust positions 282 and 284 using one or more equations and/or lookup tables that relate the operating parameters 308 to target intake and exhaust phaser angles. Examples of the operating parameters 308 include coolant temperature, barometric pressure, outdoor ambient temperature, and other operating parameters.

The target module 304 sets the target intake and exhaust positions 282 and 284 to respective predetermined angles during auto-stop events (when the auto-stop/start signal 292 is in the first state). The target module 304 also sets the target intake and exhaust positions 282 and 284 to the respective predetermined angles while the ICE 202 is off before being started (e.g., when the ignition signal 124 is in the ON state after being transitioned from the OFF state to the ON state and before the ignition signal 124 transitions to the CRANK state). The predetermined angles may be the fully retarded angles or another suitable angle.

When a current signal 312 is in a first state, the motor driver module 254 applies power from a battery 316 to the electric motors 258 and 264 to achieve the target intake and exhaust positions 282 and 284, respectively. When the current signal 312 is in a second state, the motor driver module 254 disconnects the electric motors 258 and 264 from the battery 316, which disables current flow through the electric motors 258 and 264.

A current module 320 sets the current signal 312. When the ICE 202 is running (on), the current module 320 sets the current signal 312 to the first state. During auto-stop events (when the auto-stop/start signal 292 is in the first state), the current module 320 selectively transitions the current signal 312 from the first state to the second state and from the second state to the first state. While the ICE 202 is off before being started (e.g., when the ignition signal 124 is in the ON state after being transitioned from the OFF state to the ON state and before the ignition signal 124 transitions to the CRANK state), the current module 320 selectively transitions the current signal 312 from the first state to the second state and from the second state to the first state.

While the current signal 312 is in the second state, the valve springs bias the intake and exhaust cam phaser angles away from the target intake and exhaust positions 282 and 284. While the current signal 312 is in the first state during auto-stop events and while the ICE 202 is off before being started, the electric motors 258 and 264 draw power from the battery 316 and adjust the intake and exhaust cam phaser angles toward the target intake and exhaust positions 282 and 284. Transitioning the current signal 312 back and forth between the first state and the second state during auto-stop events and while the ICE 202 is off before being started decreases (overall) power consumption and decreases average temperatures of the electric motors 258 and 264 relative to constantly applying power to the electric motors 258 and 264. Transitioning the current signal 312 back and forth between the first state and the second state during auto-stop events and while the ICE 202 is off before being started also more closely achieves the target intake and exhaust positions 282 and 284 at startup of the ICE 202 and provides better startups of the ICE 202.

Figure 4:
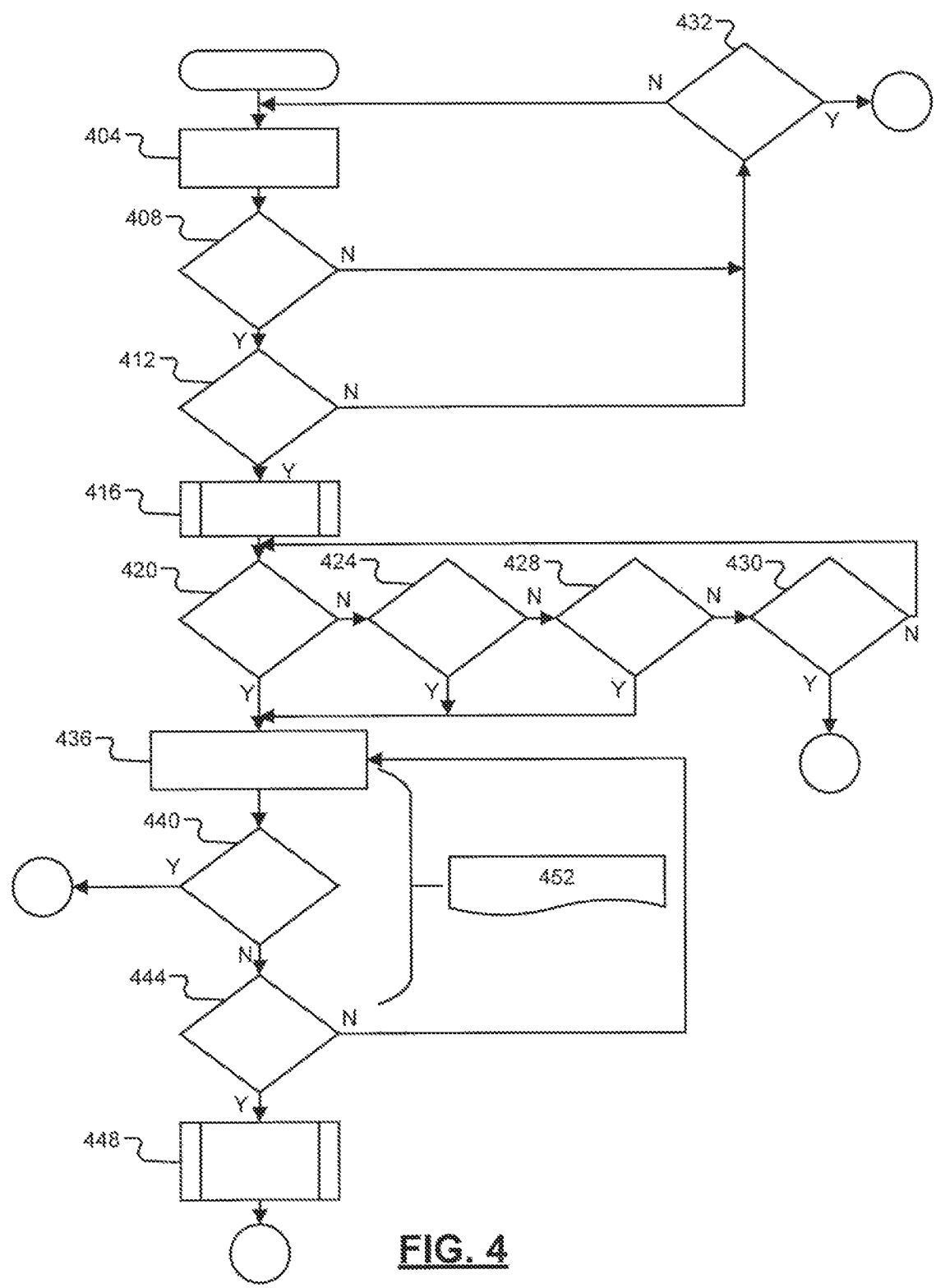
FIGS. 4-6 include an example flowchart depicting an example method of controlling intake cam phasing during auto-stop events and while the engine is off before being started.
Figure 5:
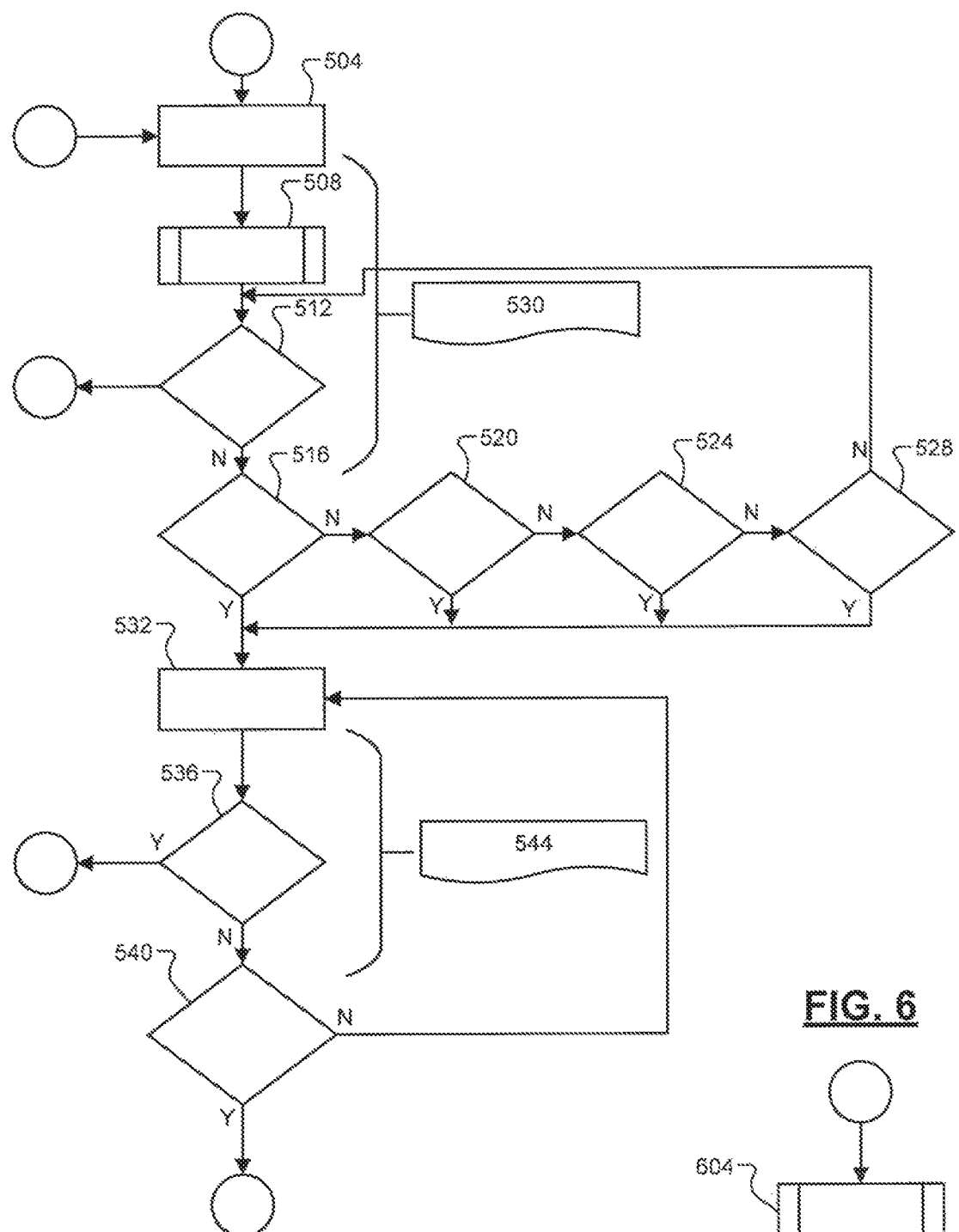
Figure 6:
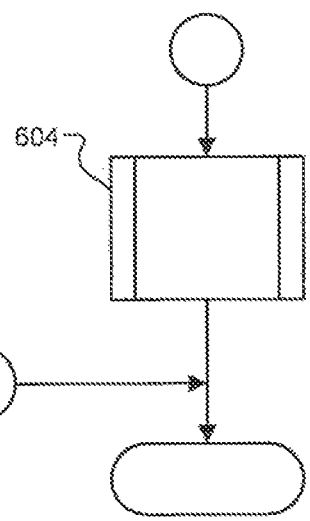

FIGS. 4-6 include an example flowchart depicting an example method of controlling intake cam phasing during auto-stop events and while the ICE 202 is off before being started. Referring to FIG. 4, control begins with 404 when the auto-stop/start signal 292 transitions to the first state or when the ignition signal 124 is in the ON state after being transitioned from the OFF state to the ON state and before the ignition signal 124 transitions to the CRANK state). While the following will be discussed using the intake phaser 250, the following is also applicable to the exhaust cam phaser 252.

At 404, the current module 320 sets the current signal 312 to the first state. The motor driver module 254 applies power to the electric motor 258 (and current flows through the electric motor 258) to achieve the target intake position 282.

At 408, the current module 320 determines whether a speed of the ICE 202 (an engine speed 324) is equal to zero or less than a first predetermined speed (e.g., 2 revolutions per minute or another suitable speed). An engine speed module 328 determines the engine speed 324 based on the CPS 270. For example, the engine speed module 328 may determine the engine speed 324 based on a change in the crankshaft position over a period (e.g., the period between two pulses in the CPS 270). If 408 is true, control continues with 412. If 408 is false, control transfers to 432, which is discussed further below.

At 412, the current module 320 determines whether a speed of the motor 258 (a motor speed 332) is equal to zero or less than a second predetermined speed (e.g., 1 revolution per minute or another suitable speed). The second predetermined speed may be less than or equal to the first predetermined speed. The second speed may be less than (e.g., half of) the first predetermined speed as the crankshaft may rotate approximately twice as fast as the intake camshaft 238. A motor speed module 336 determines the motor speed 332 based on the intake camshaft position 279. For example, the motor speed module 336 may determine the motor speed 332 based on a change in the intake camshaft position over a period (e.g., the period between two pulses in the intake camshaft position signal 279). If 412 is true, control continues with 416. If 412 is false, control transfers to 432, which is discussed further below.

At 416, the current module 320 initializes a first timer value of a first timer module 340 to a first predetermined period. The first timer module 340 counts down the first timer value as time passes. The first predetermined period may be, for example, 1 second or another suitable period. The first predetermined period may be fixed or variable. In the example of the first predetermined period being a variable, the first timer module 340 may set the first predetermined period, for example, based on a coolant temperature and/or an ambient temperature. The first timer module 340 may set the first predetermined period using one of a lookup table and an equation that relates coolant temperatures and/or ambient temperatures to first predetermined periods. The first predetermined period may be set to allow for startup of the ICE 202 within a short period. While the example of a countdown timer is provided, the first timer module 340 may alternatively count up and be initialized to zero.

At 420, the current module 320 determines whether the first timer value is equal to zero. In other words, the current module 320 determines whether the first timer value (Timer 1) has expired. In the example of a count-up timer, the current module 320 determines whether the first timer value is greater than or equal to the first predetermined period at 420. If 420 is true, control continues with 436, which is discussed further below. If 420 is false, control transfers to 424.

At 424, the current module 320 determines whether a temperature 344 of the electric motor 258 is greater than a third predetermined temperature (value 3). The third predetermined temperature is calibratable and is greater than zero degrees. The temperature 344 may be measured using the temperature sensor 260 or estimated based on one or more other parameters. If 424 is true, control continues with 436, which is discussed further below. If 424 is false, control transfers to 428.

At 428, the current module 320 determines whether a current 348 through the electric motor 258 is greater than a predetermined current (value 4). The predetermined current is calibratable and is greater than zero amps. The current 348 may be measured using the current sensor 261 or estimated based on one or more other parameters. If 428 is true, control continues with 436, which is discussed further below. If 428 is false, control transfers to 430. At 430, the current module 320 determines whether engine startup has been requested. For example, the current module 320 may determine whether the auto-stop/start signal 292 transitioned from the first state to the second state or if the ignition signal 124 transitioned from the ON state to the CRANK state. An ignition module may transition the ignition signal 124 from the ON state to the CRANK state, for example, when the brake pedal is depressed (e.g., as indicated by the BPP) and user input to an ignition switch or button is received. If 430 is true, control transfers to IV of FIG. 6, and control ends. If 430 is false, control returns to 420 and current to the electric motor 258 is maintained ON.

At 432, the current module 320 determines whether engine startup has been requested. For example, the current module 320 may determine whether the auto-stop/start signal 292 transitioned from the first state to the second state or if the ignition signal 124 transitioned from the ON state to the CRANK state. An ignition module may transition the ignition signal 124 from the ON state to the CRANK state, for example, when the brake pedal is depressed (e.g., as indicated by the BPP) and user input to an ignition switch or button is received. If 432 is true, control transfers to IV of FIG. 6, and control ends. If 432 is false, control returns to 404.

At 436, the current module 320 generates a store signal 352, which prompts a storage module 356 to store the intake camshaft position 279 measured by the camshaft position sensor 272. Alternatively, the storage module 356 may store the target intake position 282 when the store signal 352 is generated. Also at 436, the current module 320 transitions the current signal 312 from the first state to the second state. The motor driver module 254 disables current flow through the electric motor 258 when the current signal 312 is in the second state. The storage module 356 outputs the stored intake camshaft position as a stored position 360. The stored position 360 corresponds to the initial value of the intake camshaft position 279 before current to the electric motor 258 is disabled and the valve springs urge the intake camshaft position 279 away from the target intake position 282.

A delta module 364 determines a delta position 368 based on a difference between the stored position 360 and (the present value of) the intake camshaft position 279. For example, the delta module 364 may set the delta position 368 based on an absolute value of the stored position 360 minus the intake camshaft position 279. The delta module 364 updates the delta position 368 each predetermined period, such as after each performance of 444.

At 440, the current module 320 determines whether engine startup has been requested. For example, the current module 320 may determine whether the auto-stop/start signal 292 transitioned from the first state to the second state or if the ignition signal 124 transitioned from the ON state to the CRANK state. If 440 is true, control transfers to IV of FIG. 6, and control ends. If 440 is false, control continues with 444

At 444, the current module 320 determines whether the delta position 368 is greater than a first predetermined position (value 1). The first predetermined position may be calibratable. For example only, the first predetermined position may be approximately 2.5 cam angle degrees, 5 crank angle degrees, or another suitable value. If 444 is true, control enters an ON/OFF mode at 448, and control continues with I of FIG. 5. If 444 is false, control returns to 436. In this manner, the valve springs are allowed to rotate the intake camshaft 238 by the first predetermined position while the electric motor 258 is disconnected from the battery 316, as indicated by 452.

The ON/OFF mode involves the current module 320 selectively enabling and disabling application of power to the electric motor 258 from the battery 316 while the ICE 202 is off. Disabling power to the electric motor 258 allows the valve springs to bias the intake camshaft position 279 away from the target intake position 282, but decreases the temperature 344 of the electric motor 258 and decreases (overall) power consumption of the electric motor 258. Applying power to the electric motor 258 drives the intake camshaft position 279 toward or to the target intake position 282, which positions the intake camshaft 238 for a better (e.g., smoother) engine startup. By selectively enabling and disabling power to the electric motor 258, power consumption and temperature of the electric motor 258 are decreased while providing for a better engine startup than maintaining power to the electric motor 258 off.

Referring to FIG. 5, at 504, the current module 320 transitions the current signal 312 to the first state. When the current signal 312 is in the first state, the motor driver module 254 applies power to the electric motor 258 from the battery 316 to adjust the intake camshaft position 279 toward or to the target intake position 282.

At 508, the current module 320 initializes a second timer value of a second timer module 372 to a second predetermined period. The second timer module 372 counts down the second timer value as time passes. The second predetermined period may be calibratable and may be, for example, 1 second or another suitable period. The second predetermined period may be fixed or variable. In the example of the second predetermined period being a variable, the second timer module 372 may set the second predetermined period, for example, based on the coolant temperature and/or the ambient temperature. The second timer module 372 may set the second predetermined period using one of a lookup table and an equation that relates coolant temperatures and/or ambient temperatures to second predetermined periods. The second predetermined period may be the same length as or a different length than the first predetermined period. While the example of a countdown timer is provided, the second timer module 372 may alternatively count up and be initialized to zero.

At 512, the current module 320 determines whether engine startup has been requested. For example, the current module 320 may determine whether the auto-stop/start signal 292 transitioned from the first state to the second state or if the ignition signal 124 transitioned from the ON state to the CRANK state. If 512 is true, control transfers to III of FIG. 6, which is discussed further below. If 512 is false, control continues with 516.

At 516, the current module 320 determines whether the second timer value is equal to zero. In other words, the current module 320 determines whether the second timer value (Timer 2) has expired. In the example of a count-up timer, the current module 320 determines whether the second timer value is greater than or equal to the second predetermined period at 516. If 516 is true, control continues with 532, which is discussed further below. If 516 is false, control transfers to 520.

At 520, the current module 320 determines whether the delta position 368 is less than a second predetermined position (value 2). The second predetermined position may be calibratable and is less than the first predetermined position. For example only, the second predetermined position may be approximately 0.25 cam angle degrees, 0.5 crank angle degrees, or another suitable value. If 520 is true, control continues with 532, which is discussed further below. If 520 is false, control transfers to 524.

At 524, the current module 320 determines whether the temperature 344 of the electric motor 258 is greater than the predetermined temperature (value 3). If 524 is true, control continues with 532, which is discussed further below. If 524 is false, control transfers to 528.

At 528, the current module 320 determines whether the current 348 through the electric motor 258 is greater than the predetermined current (value 4). If 528 is true, control continues with 532. If 528 is false, control returns to 512, and the motor driver module 254 continues applying power to the electric motor 258 from the battery 316 to adjust the intake camshaft position 279 toward or to the target intake position 282.

In this manner, the motor driver module 254 applies power to the electric motor 258 to adjust the intake camshaft position 279 toward or to the target intake position 282 until startup of the ICE 202 is requested, the second timer value expires, the delta position 368 becomes less than the second predetermined position, the temperature 344 becomes greater than the predetermined temperature, or the current 348 becomes greater than the predetermined current. This is indicated by 530.

At 532, the current module 320 transitions the current signal 312 from the first state to the second state. The motor driver module 254 disables current flow through the electric motor 258 when the current signal 312 is in the second state.

At 536, the current module 320 determines whether engine startup has been requested. For example, the current module 320 may determine whether the auto-stop/start signal 292 transitioned from the first state to the second state or if the ignition signal 124 transitioned from the ON state to the CRANK state. If 536 is true, control transfers to III of FIG. 6, which is discussed further below. If 536 is false, control continues with 540.

At 540, the current module 320 determines whether the delta position 368 is greater than the first predetermined position (value 1). If 540 is true, control returns to 504, as illustrated by II. If 540 is false, control returns to 532. In this manner, the valve springs are allowed to rotate the intake camshaft 238 by the first predetermined position while the electric motor 258 is disconnected from the battery 316, as indicated by 544.

Referring to FIG. 6, control transitions from III to 604 where the current module 320 exits the ON/OFF mode. The current module 320 transitions or maintains the current signal 312 in the first state. The motor driver module 254 applies current to the electric motor 258 to adjust the intake camshaft position 279 toward or to the target intake position 282.

FIG. 7 includes an example graph of engine speed 704 and intake camshaft position 708 over time during an auto-stop/start event. FIG. 7 also includes a first trace 712 indicative of whether the intake camshaft position 708 is being actively controlled 713 or not 714 toward a target position 716, and a second trace 720 that tracks the whether current through the electric motor 258 is disabled 721 or not 722.

The auto-stop/start signal 292 transitions to the first state at approximately time 724. The engine speed 704 therefore decreases from approximately an idle speed 728 to zero. The current module 320 controls the motor driver module 254 to apply power to the electric motor 258 to adjust the intake camshaft position 708 toward or to the target position 716 between time 732 and 736 until at least one of 420-428 above are true.

At time 732, the current module 320 transitions the current signal 312 to the second state, and the motor driver module 254 disables current through the electric motor 258, as indicated by the second trace 720. While current through the electric motor 258 is disabled, the intake camshaft position 708 is not being actively controlled, and the intake camshaft position 708 moves away from the target position 716 due to the biasing of the valve springs.

At time 740, when 444 is true, the current module 320 transitions the current signal 312 to the first state, and the motor driver module 254 applies current to the electric motor 258 to adjust the intake camshaft position 708 toward the target position 716. This continues until time 744 when one or more of 516-528 are true. At time 744, the current module 320 transitions the current signal 312 back to the second state, and the motor driver module 254 disables current through the electric motor 258, as indicated by the second trace 720. This process of turning the electric motor 258 on and off continues.

The auto-stop/start signal 292 transitions to the second state at approximately time 748. The engine speed 704 therefore increases from zero to the idle speed 728.

FIG. 8 includes an example graph of the traces of FIG. 7 while the ICE 202 is off, the ignition signal 124 is in the ON state but has not yet transitioned to the CRANK state. At time 804, a driver interface module transitions the ignition signal 126 from the OFF state to the ON state. The driver interface module may transition the ignition signal 126 from the OFF state to the ON state, for example, in response to user actuation of the ignition button or switch while the brake pedal is not being depressed (e.g., as indicated by the BPP). The current module 320 controls the motor driver module 254 to apply power to the electric motor 258 to adjust the intake camshaft position 708 toward or to the target position 716 until at least one of 420-428 above are true at time 808.

At time 808, the current module 320 transitions the current signal 312 to the second state, and the motor driver module 254 disables current through the electric motor 258, as indicated by the second trace 720. While current through the electric motor 258 is disabled, the intake camshaft position 708 is not being actively controlled, and the intake camshaft position 708 moves away from the target position 716 due to the biasing of the valve springs.

At time 812, when 444 is true, the current module 320 transitions the current signal 312 to the first state, and the motor driver module 254 applies current to the electric motor 258 to adjust the intake camshaft position 708 toward the target position 716. This continues until time 816 when one or more of 516-528 are true. At time 816, the current module 320 transitions the current signal 312 back to the second state, and the motor driver module 254 disables current through the electric motor 258, as indicated by the second trace 720. This process of turning the electric motor 258 on and off continues.

At time 820, the ignition signal 126 transitions to the CRANK state, and the ICE 202 is started. The engine speed 704 therefore increases from zero to the idle speed 728.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system of a vehicle, comprising:
an electric motor configured to phase rotation of a camshaft of an engine relative to rotation of a crankshaft of the engine;
a current module configured to, while the engine is off and an ignition system of the vehicle is on during an auto-stop portion of an auto-stop/start event:
selectively transition a current signal back and forth between a first state and a second state; and
a motor driver module configured to, while the engine is off and the ignition system of the vehicle is on during the auto-stop portion of the auto-stop/start event:
apply power to the electric motor from a battery and adjust a position of the camshaft toward a predetermined position when the current signal is in the first state; and
disconnect the electric motor from the battery and allow the position of the camshaft to move away from the predetermined position when the current signal is in the second state.

2. The control system of claim 1 wherein the current module is configured to, during the auto-stop portion of the auto-stop/start event, set the current signal to the first state and maintain the current signal in the first state for a predetermined period after both (a) a first rotational speed of the crankshaft reaches zero during the auto-stop portion of the auto-stop/start event and (b) a second rotational speed of the electric motor reaches zero during the auto-stop portion of the auto-stop/start event.

3. The control system of claim 2 wherein the current module is further configured to, during the auto-stop portion of the auto-stop/start event, transition the current signal from the first state to the second state when the predetermined period has passed after both (a) the first rotational speed of the crankshaft reached zero during the auto-stop portion of the auto-stop/start event and (b) the second rotational speed of the electric motor reaches zero during the auto-stop portion of the auto-stop/start event.

4. The control system of claim 3 wherein the current module is further configured to, during the auto-stop portion of the auto-stop/start event, maintain the current signal in the second state until a difference between the position of the camshaft when the current signal transitioned from the first state to the second state and a present position of the camshaft is greater than a first predetermined position.

5. The control system of claim 4 wherein the current module is further configured to, during the auto-stop portion of the auto-stop/start event, transition the current signal from the second state to the first state when the difference is greater than the first predetermined position.

6. The control system of claim 5 wherein the current module is further configured to, during the auto-stop portion of the auto-stop/start event, maintain the current signal in the first state for a second predetermined period after the difference is greater than the first predetermined position.

7. The control system of claim 5 wherein the current module is configured to maintain the current signal in the first state until the difference is less than a second predetermined position that is less than the first predetermined position.

8. The control system of claim 1 wherein the current module is configured to, during the auto-stop portion of the auto-stop/start event, set the current signal to the first state and maintain the current signal in the first state until a temperature of the electric motor is greater than a predetermined temperature after both (a) a first rotational speed of the crankshaft reaches zero during the auto-stop portion of the auto-stop/start event and (b) a second rotational speed of the electric motor reaches zero during the auto-stop portion of the auto-stop/start event.

9. The control system of claim 8 wherein the current module is further configured to, during the auto-stop portion of the auto-stop/start event, transition the current signal from the first state to the second state when the temperature of the electric motor is greater than the predetermined temperature.

10. The control system of claim 9 wherein the current module is further configured to, during the auto-stop portion of the auto-stop/start event, maintain the current signal in the second state until a difference between (a) a present position of the camshaft is greater than a first predetermined position; and (b) one of (1) a target position of the camshaft when the current signal transitioned from the first state to the second and (2) the position of the camshaft when the current signal transitioned from the first state to the second state.

11. The control system of claim 10 wherein the current module is further configured to, during the auto-stop portion of the auto-stop/start event, transition the current signal from the second state to the first state when the difference is greater than the first predetermined position.

12. The control system of claim 11 wherein the current module is further configured to, during the auto-stop portion of the auto-stop/start event, maintain the current signal in the first state until the temperature of the electric motor is greater than the predetermined temperature.

13. The control system of claim 11 wherein the current module is configured to maintain the current signal in the first state until the difference is less than a second predetermined position that is less than the first predetermined position.

14. The control system of claim 1 wherein the current module is configured to set the current signal to the first state and maintain the current signal in the first state until a current through the electric motor is greater than a predetermined current after both (a) a first rotational speed of the crankshaft reaches zero during the auto-stop portion of the auto-stop/start event and (b) a second rotational speed of the electric motor reaches zero during the auto-stop portion of the auto-stop/start event.

15. The control system of claim 14 wherein the current module is further configured to, during the auto-stop portion of the auto-stop/start event, transition the current signal from the first state to the second state when the current through the electric motor is greater than the predetermined current.

16. The control system of claim 15 wherein the current module is further configured to, during the auto-stop portion of the auto-stop/start event, maintain the current signal in the second state until a difference between (a) a present position of the camshaft is greater than a first predetermined position; and (b) one of (1) a target position of the camshaft when the current signal transitioned from the first state to the second and (2) the position of the camshaft when the current signal transitioned from the first state to the second state.

17. The control system of claim 16 wherein the current module is further configured to, during the auto-stop portion of the auto-stop/start event, transition the current signal from the second state to the first state when the difference is greater than the first predetermined position.

18. The control system of claim 17 wherein the current module is further configured to, during the auto-stop portion of the auto-stop/start event, maintain the current signal in the first state until the current through the electric motor is greater than the predetermined current.

19. A control system of a vehicle, comprising:
an electric motor configured to phase rotation of a camshaft of an engine relative to rotation of a crankshaft of the engine;
a current module configured to, while the engine is off and an ignition system of the vehicle is on before the engine is started:
selectively transition a current signal back and forth between a first state and a second state; and
a motor driver module configured to, while the engine is off and the ignition system of the vehicle is on before the engine is started:
apply power to the electric motor from a battery and adjust a position of the camshaft toward a predetermined position when the current signal is in the first state; and
disconnect the electric motor from the battery and allow the position of the camshaft to move away from the predetermined position when the current signal is in the second state.

20. A control system of a vehicle, comprising:
a cam phaser configured to phase rotation of a camshaft of an engine relative to rotation of a crankshaft of the engine;
a current module configured to, while the engine is off and an ignition system of the vehicle is on during an auto-stop portion of an auto-stop/start event:
selectively transition a current signal back and forth between a first state and a second state; and
a motor driver module configured to, while the engine is off and the ignition system of the vehicle is on during the auto-stop portion of the auto-stop/start event:
apply power to an electric motor from a battery and adjust a position of the camshaft toward a predetermined position when the current signal is in the first state; and
disconnect the electric motor from the battery and allow the position of the camshaft to move away from the predetermined position when the current signal is in the second state.

* * * * *